No. 876,427. PATENTED JAN. 14, 1908.
G. T. BENSON.
COMBINED CAN TOP AND SAMPLE CARRIER.
APPLICATION FILED SEPT. 7, 1905.
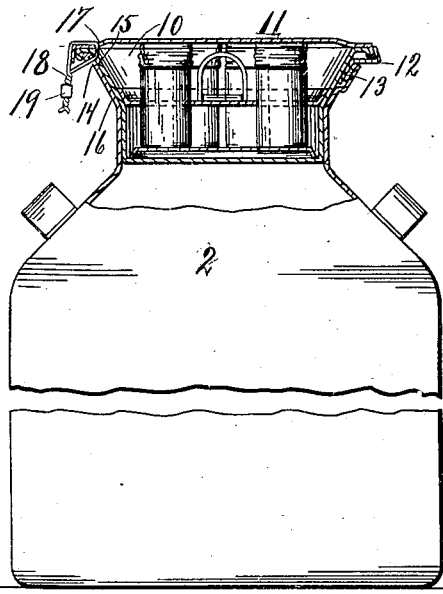
Fig.1.
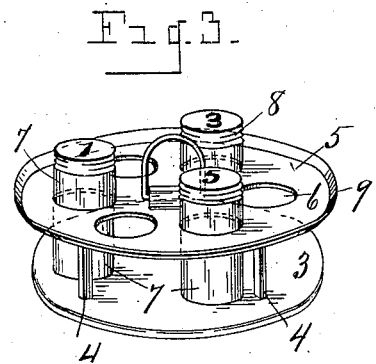
Fig.3.
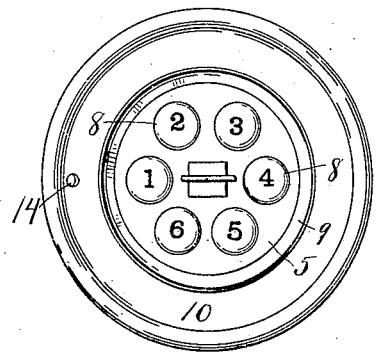
Fig.2.
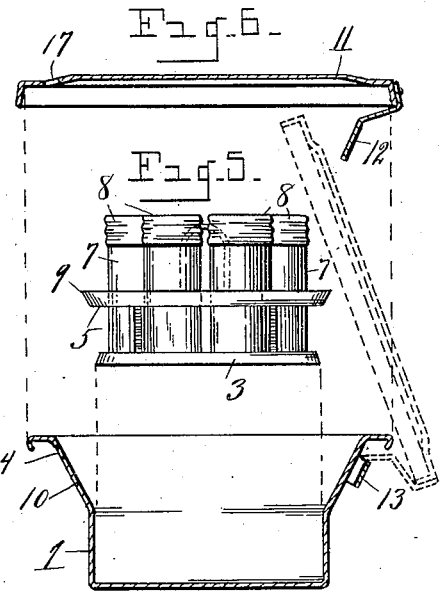
Fig.6.
Fig.5.
Fig.4.
Witnesses.
O. B. Baenziger
J. G. Howlett
Inventor
George T. Benson.
By T. J. Wheeler & Co., Attys.

UNITED STATES PATENT OFFICE.

GEORGE T. BENSON, OF PORT HURON, MICHIGAN, ASSIGNOR OF ONE-QUARTER TO HERBERT L. NELSON, OF DETROIT, MICHIGAN.

COMBINED CAN-TOP AND SAMPLE-CARRIER.

No. 876,427.     Specification of Letters Patent.     Patented Jan. 14, 1908.

Application filed September 7, 1905. Serial No. 277,376.

*To all whom it may concern:*

Be it known that I, GEORGE T. BENSON, a citizen of the United States, residing at Port Huron, in the county of St. Clair, State of Michigan, have invented certain new and useful Improvements in a Combined Can-Top and Sample-Carrier; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a combined can top and sample carrier adapted for use in connection with the business of transporting and centralizing milk and cream, and consists in the construction and arrangement of parts hereinafter fully set forth and pointed out particularly in the claims.

The object of the invention is to provide simple and efficient means for carrying within the can top samples of the cream from each customer with which the can is filled, enabling when the can reaches its destination, the testing and weighing of said samples to determine the amount of butter-fat they contain, for the purpose of ascertaining the sum that is due each customer for the amount of cream purchased from each, whereby the cream from several producers may be placed in one can without confusion and each customer paid for the cream supplied in accordance with its richness. The above object is attained by the arrangement illustrated in the accompanying drawings, in which:—

Figure 1 is a view of a milk or cream can, such as is commonly used for shipping said products, the top portion of the can being in section, showing my improved carrying tray therein and the sample bottles within said tray. Fig. 2 is a plan view of the top with the cover removed. Fig. 3 is a perspective view of the tray, showing some of the sample bottles therein. Fig. 4 is a central, vertical section through the can top, showing by dotted lines the cover tilted backwardly therefrom in position for removal. Fig. 5 is an elevation of the tray adapted to be seated within said top. Fig. 6 is a transverse section through the cover.

In the business of centralizing cream for the manufacture of butter and other purposes, it has been the custom to leave a can with each customer or producer, and upon the day of collection to take said can whether wholly or partially filled and ship it to the point of centralization. The freight charge upon a can partly filled is as great as that upon a filled can, and in cases where the cans which were shipped were only half filled, the freight charge upon the contents would be twice that upon the contents of a filled can, making it necessary to charge back to the producer having a partly filled can the difference in the freight charges, or impose upon the shipper the necessity of paying an excessive freight rate upon a small quantity of cream. To overcome said situation and provide an arrangement whereby each can may be completely filled before shipment, by combining therein the products of several customers, I employ a sample carrier adapted to be placed in the top 1 of the can 2, said carrier consisting of a circular tray 3, of a diameter equal to the inner diameter of the can top across the cylindrical portion thereof. Mounted upon the tray 3, by means of the posts 4, is a circular plate 5 having a plurality of apertures 6 therethrough, of a diameter to receive the sample bottles 7, and which are supported in said apertures and rest upon the tray, said bottles being provided with screw tops 8, whereby the contents may be securely retained therein. The tray 3 is adapted to lie within the can top, the supporting plate 5 having an upwardly turned flange 9 which stands at an angle coincident to the flaring wall 10 of said top, whereby the tray is securely retained in place against lateral movement.

To prevent surreptitious access to the sample bottles upon the tray within the can top, a cover 11 is employed provided with an angular tongue 12 riveted to one margin thereof adapted to enter a keeper 13 secured on the outer bearing face of the can top, to hold said cover in position. For the purpose of locking said parts together so as to prevent the removal of the can top from the can, or the removal of the sample carrier from said top, registering apertures 14 and 15 are formed through the outwardly flaring portion 16 of the can, and through the flaring portion 10 of the can top, and an aperture 17 is formed through the cover 11; through these apertures a wire 18 is looped and it is secured by a seal 19, whereby surreptitious access to the can, and to the sample carrier cannot be had without detection.

It will be noted that the cover 11 closes firmly over the can top and that the height of the sample bottles 7 is such that the tops of said bottles support the cover, whereby more firmly holding the bottles in place and preventing breakage thereof in transportation, at the same time enabling the cans to be stacked one upon the other to facilitate shipment.

The tray shown in the drawings is constructed to receive six sample bottles, but the number may be increased or decreased according to the requirements. Upon the tops of each of the bottles is a reference numeral, as indicated in Figs. 2 and 3, whereby each bottle may be designated.

In carrying out this invention, the collector goes over the route and collects the cream from the customers, filling a sample bottle from the cream of each customer, and making a record upon a proper slip or form which accompanies each carrier, of the amount of cream received. By this arrangement, the cream from a number of customers may be placed in a single can until the can is completely filled, when the sample bottles filled with the cream from the several customers, are placed within the top and said top secured to the can and the cover to the top by means of the wire and seal, as illustrated in Fig. 1. When a can reaches its destination, it is opened and the carrier containing the samples removed to the testing room, the cream being placed in the general stock. The samples of cream are then tested and weighed and each customer credited with the amount due him according to the quantity of cream received and the amount of butter-fat contained therein, the records of the customers being kept separate because of the distinguishing number upon each sample bottle which corresponds with the account number of the customer from whom the cream was received.

Having thus fully set forth my invention, what I claim as new and desire to secure by Letters Patent, is:—

A combined can top and sample carrier, consisting of a top in the form of a receptacle adapted to close a can, provided with a flaring outer opening, a carrier tray in said receptacle adapted to be removed therefrom, said tray having an apertured supporting plate with an upwardly turned marginal flange which coincides with and engages the flaring wall of the can top opening to retain the carrier in position, the apertures in said plate being adapted to receive bottles, a cover adapted to close the can top and to confine the bottles in the carrier, and means for locking the cover to the can top and the can top to the can.

In testimony whereof, I sign this specification in the presence of two witnesses.

GEORGE T. BENSON.

Witnesses:
LEWIS ATKINS,
S. V. JONES.